United States Patent [19]
Oh

[11] Patent Number: 5,012,761
[45] Date of Patent: May 7, 1991

[54] CHICKEN EGG HAVING RELATIVELY HIGH PERCENTAGE OF LONG CHAIN FATTY ACIDS AND METHOD OF REDUCING HEART RELATED DISEASE IN HUMANS USING SUCH EGGS

[76] Inventor: Suk Y. Oh, 108 Flagstone, Lee's Summit, Mo. 64063

[21] Appl. No.: 273,229

[22] Filed: Nov. 17, 1988

[51] Int. Cl.$^5$ ............................................... A23K 1/16
[52] U.S. Cl. ............................................ 119/6.8; 426/2
[58] Field of Search ................................ 119/1; 426/2

[56] References Cited

U.S. PATENT DOCUMENTS

| | | | |
|---|---|---|---|
| 2,593,577 | 4/1952 | Lewis | 426/2X |
| 4,880,639 | 11/1989 | Lauermann et al. | 426/2 |
| 4,925,637 | 5/1990 | Julien et al. | 426/2 |
| 4,960,795 | 10/1990 | Salte et al. | 426/2 X |

FOREIGN PATENT DOCUMENTS

| | | | |
|---|---|---|---|
| 157619 | 10/1985 | European Pat. Off. | 426/2 |
| 105471 | 6/1985 | Japan | 426/2 |

OTHER PUBLICATIONS

*Arteriosclerosis*, D. Illingworth, W. Harris, and W. Connor; "Inhibition of Low Density Lipoprotein Synthesis by Dietary Omega-3 Fatty Acids in Humans", vol. 4, No. 3, May, 1984.

*Journal of Lipid Research*, S. Balasubramiam, L. Simons, S. Chang and B. Hickie; "Reduction in Plasma Cholesterol and Increase in Biliary Cholestrol by a Diet Rich in m-3 Fatty Acids in the Rat", vol. 26, 1986.

*Experimental Nutrition*, "Cholesterol Metabolism and Omega-3 Polyenes in Fish Oils", vol. 44, No. 4, Apr., 1986.

*Feedstuffs*, Robert Brown; "Layer Feed Additive Sparks New Research", vol. 60, No. 39, Sep. 19, 1988.

*Primary Examiner*—Robert P. Swiatek
*Attorney, Agent, or Firm*—Littman, McMahon & Brown

[57] ABSTRACT

Chickens are fed a composition including fish oil over a period of time. Modified eggs laid by such chickens contain substantial quantities of omega-3 polyunsaturated fatty acids. The modified eggs are fed to humans with the result that serum cholesterol, serum triglycerides and blood pressure are reduced as compared to humans eating a like number of regular eggs with a subsequent decrease in heart disease.

8 Claims, No Drawings

CHICKEN EGG HAVING RELATIVELY HIGH PERCENTAGE OF LONG CHAIN FATTY ACIDS AND METHOD OF REDUCING HEART RELATED DISEASE IN HUMANS USING SUCH EGGS

BACKGROUND OF THE INVENTION

The present invention is directed to the production of eggs which are relatively high in omega-3 polyunsaturated fatty acids and the subsequent feeding to humans of such eggs so as to reduce the level of serum cholesterol in the humans and to reduce the likelihood of coronary heart disease in the humans.

Heart disease has been a leading cause of death among adults and is the main cause of death of middle aged men in the United States. It is generally accepted that high levels of saturated fat and, especially, high levels of cholesterol in the diet significantly increases the risk of cardiovascular disease, especially atherosclerosis, myocardial infarction, and hypertension. Other blood components such as triglyceride level, low density lipoproteins (LDL) level and very low density lipoprotein level (VLDL) are also affected by diet and high levels are linked to certain heart and vascular diseases. In populations where the level of saturated fat in the diet is low and the level of omega-3 polyunsaturated fat is high, such as the American Eskimo, the likelihood of coronary heart disease is greatly reduced as compared to a population wherein the dietary intake of such rate of saturated fats is high, such as in the mainland United States. Certain health practitioners and medical personnel have recommended the intake of polyunsaturated fatty acids in order to reduce the likelihood of coronary heart disease. While vegetable or plant polyunsaturated oils containing omega-6 fatty acids such as linoleic acid may have some beneficial properties, it has been found that fish (marine) oils containing substantial omega-3 fatty acids such as eicosapentaeoic acid (EPA) and doeosohexenoic acid (DHA) significantly reduce the likelihood of cardiovascular disease when ingested on a regular basis. EPA is C20:5 (Number of carbons in carbon chain: number of unsaturated bonds) omega-3 and DHA is C22:6 omega-3. Higher levels of such polyunsaturated fatty acids in humans have also been linked to a reduction in cholesterol levels in the blood serum, reduced blood pressure and other beneficial results.

Further, for persons that have elevated cholesterol levels and, therefore, may have an increased risk of coronary heart disease, many medical practitioners and health advisors recommend reducing intake of cholesterol. Since chicken eggs represent a very high source of cholesterol (typically approximately 280 mgs per large egg) many medical practitioners and health consultants recommend eliminating eggs from the diet of those having high cholesterol blood serum concentrations.

Although the level of cholesterol in the blood serum which is considered dangerous has been modified several times in recent years (almost always downwardly), it is generally agreed that the cholesterol level in the blood should be as low as possible. Consequently, for persons having cholesterol levels that are considered too high, conventional chicken eggs are almost eliminated as a source of food. This is somewhat unfortunate since eggs represent a substantial source of protein, minerals and other nutrients in a form which is considered to be high in quality, nutrition and density while being relatively low in cost.

Fish oil is generally considered to be the best source of omega-3 polyunsaturated fatty acids. Most fish oil includes about 20% polyunsaturated fatty acids which are in the range of C-20 to C-22 with some variation; however, as used herein, the term "fish oil" is always characterized as comprising polyunsaturated fatty acids having at least three and normally four or more double bonds and are preferably omega-3 fatty acids. As used herein, the term fish oil does include fish liver oil.

Under the advise of health practitioners and the like, many persons have attempted to lower their risk of heart disease by suggesting raw fish oil either in tablets or in other food. Taking fish oil supplements has met with mixed results since the fish oil often has a bad taste if not encapsulated or de-scented, persons have a tendency to forget to take the supplements, and, even with the supplements, often elect not to eat hens eggs and, consequently, fail to receive the dietary benefits of the eggs.

SUMMARY OF THE INVENTION

Applicant combined the health benefits associated with the fish oil with the food benefits associated with the chicken egg. While it is understood that broiler chickens have previously been fed fish meal, the meat of the resulting chickens (which were produced as fryers for eating rather than as layers for laying eggs) had a decidedly fishy taste and were not well accepted by the public. Applicant feeds laying hens fish oil and the hens lay eggs having a modified fatty acid content as compared to normal chicken eggs.

In particular, it was found to be surprising that the chickens essentially pass the fish oil into the eggs produced by the chickens in substitution of or in combination with many of the normal fats or oils contained in the eggs. Although fish oil is a preferred source of the fatty acids, it is foreseen that other sources of polyunsaturated fats, especially having omega-3 fatty acids may be utilized under the scope of the present invention. These modified eggs containing the fish oil are then subsequently fed to humans. Although the cholesterol level in the modified eggs produced by the chickens eating fish oil is somewhat lowered, the most significant feature of the eggs is considered to be the high omega-3 polyunsaturated fatty acid content thereof. The humans who consumed the eggs in substitution to normal eggs subsequently were found to have a reduced serum cholesterol level. These persons also were found to have other signs which indicated that they would be less susceptible to coronary heart disease such as reduced blood pressure, lower triglyceride level, very low density lipoprotein level and the like.

As used herein, the term "oil" or "fat" is used interchangeably and indicates a triglyceride molecule generally bound to three fatty acid molecules. The term "fatty acid" as used herein is intended to mean both free fatty acids and fatty acids bound in oil or fat molecules. The term "relatively long chain polyunsaturated fatty acid" is used to mean a fatty acid having at least 18 carbons and preferably either 20 or 22 carbons and especially having at least 4 and preferably 5 or 6 double bonds. It is further intended that the term "feeding" or similar terms as used herein to indicate the consumption of fatty acids by poultry, especially chickens, is not intended to be limited to incorporation of the fatty acids into the food of the chickens. In particular, the fatty acids may be consumed by the chickens by distribution in the chickens' feed, water, given directly to the chickens, or by other methods.

In general, chickens are fed relatively long chained polyunsaturated fatty acids, especially fish oil on a daily basis. Normally, the fish oil comprises at least 1% by weight of the total food consumed by the chickens. Preferably, the range is between 1% and 10% by weight. Although higher percentages of consumed fish oil result in eggs with polyunsaturated omega-3 fatty acids therein, the egg laying capacity of the hens is reduced and cost per egg increases dramatically because of the high cost of the fish oil relative to other feeds. Further, about 5% fish oil in feed or slightly less is considered optimum in view of the testing completed at the time of filing of the present application.

The eggs produced by the above noted method are fed to humans. Preferably, the modified eggs with the omega-3 fatty acids are consumed on a daily basis in substitution of regular eggs, but may be consumed as a supplement of say four modified eggs per day with an otherwise normal diet.

The fish oil used herein is preferably de-scented prior to feeding to chickens by methods well known to the industry so as to remove the "fishy" odor and/or taste normally associated with fish oil.

OBJECTS OF THE INVENTION

The objects of the invention are: to provide a chicken egg having a relatively high percentage of relatively long chain polyunsaturated fatty acids as compared to conventional eggs; to provide such eggs having a relatively high level of omega-3 fatty acids; to provide a method of producing such eggs comprising the step of feeding to chickens fish oil at a level of approximately 1% or greater by weight of the food consumed by the chickens for a period of time and thereafter collecting eggs laid by the chickens; to provide a method of reducing the risk of heart disease in humans by feeding humans modified eggs having a relatively high content of long chain polyunsaturated fatty acids, especially omega-3 fatty acids, over a period of time; and to provide such an egg and such methods for providing the egg and using the eggs to reduce heart disease in humans that are reasonable in cost and especially well adapted for the intended purpose thereof.

DETAILED DESCRIPTION OF THE INVENTION

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

The following examples are illustrative of the invention and are not intended to limit the scope of the invention in any manner unless otherwise noted.

EXAMPLE I

Chicken Feeding

One hundred and thirty-five white Leghorn hens, five to six months in age, were randomly assigned to three experimental groups of 45 hens each on a poultry farm at Utah State University. Two groups were given feed supplemented with fish oil (sold under the trademark Max EPA by R. P. Scherer Company of Clearwater, Fla.), the first group 5% and the second group 10% by weight, and the third group was fed a normal wheat and soy diet. The composition of the diets is shown in Table 1. Analysis supplied by the manufacturer of the fish oil indicated 18% of EPA and 12% DHA by weight but analysis of the oil at the time of feeding showed the oil to be between 16.5 and 16.6% EPA and between 9.0 and 10.1% DHA by weight. Analysis of hen's feed is shown in Table 2. The diets containing oil were freshly prepared every week to minimize oxidation of the oils and 0.1% of ∂-tocopherol was added to the oils to prevent peroxidation of fatty acids. Water and feed were allowed ad libitum. Feed consumption was estimated to be about 100 grams (g)/day. Hens were fed with the experimental diets (5% or 10% fish oil) or regular diet for eight or eleven weeks, and eggs were collected. Each hen's body weight, egg production and egg weight were recorded. Pooled egg yolk samples from collected eggs were analyzed for their fatty acid composition and cholesterol concentration.

TABLE 1

| | Composition of hens' feed | | |
|---|---|---|---|
| Ingredients | 0% fish oil diet Amount (lb) | 5% fish oil diet Amount (lb) | 10% fish oil diet Amount (lb) |
| Bran | 1.341 | 13.765 | 26.188 |
| Fish Oil | 0 | 5.000 | 10.000 |
| D,L-Methionine | 0.118 | 0.124 | 0.130 |
| Layer Vitamins 560[a] | 0.250 | 0.250 | 0.250 |
| Limestone, Ground[b] | 7.523 | 7.630 | 7.736 |
| Salt, Plain | 0.250 | 0.250 | 0.250 |
| Wheat | 71.683 | 54.428 | 37.172 |
| Soybean Meal | 13.790 | 13.908 | 14.027 |
| MT/BNML41[c] | 5.044 | 4.645 | 4.246 |
| TOTAL | 100 | 100 | 100 |

[a]Layer vitamins 560 (mg/lb diet except as indicated): Vitamin A 1,200,000 IU; Vitamin D 400,000 IU; Vitamin E 400 IU; Vitamin K 400; Vitamin B12 1.2; Niacin 700; pantothenic acid 800; Choline 50,000; Folic acid 40; Thiamine 200; Pyridoxine 200; Manganese 2.64%; Zinc 2.2%; Iron 1.76%; Copper 0.176%; Iodine 0.12%; Selenium 18.16.
[b]Limestone contained 38% calcium.
[c]Meat meal/Bone meal 41 with 41% protein.

TABLE 2

| | Analysis of hens' feed | | |
|---|---|---|---|
| | Fish Oil Supplement | | |
| Ingredients | 0% | 5% | 10% |
| Metabolizable Energy, KCAL/LB | 1280 | 1280 | 1280 |
| % Crude Fat | 1.77 | 6.91 | 12.04 |
| % Protein | 16.00 | 16.00 | 16.00 |
| % Lysine | 0.85 | 1.5 | 2.41 |
| % Methionine ± CYS | 0.35 | 0.35 | 0.35 |
| % Leucine | 0.64 | 0.63 | 0.62 |
| % Valine | 0.73 | 0.74 | 0.75 |
| % Isoleucine | 0.83 | 0.80 | 0.76 |
| % Arginine | 0.90 | 0.95 | 0.99 |
| % Threonine | 0.55 | 0.54 | 0.53 |
| % Phenylalanine | 0.70 | 0.68 | 0.66 |
| % Histidine | 0.34 | 0.35 | 0.36 |
| % Tryptophan | 0.21 | 0.22 | 0.22 |
| % Calcium | 3.50 | 3.50 | 3.50 |
| % Phosphose | 0.42 | 0.42 | 0.42 |
| % Sodium | 0.17 | 0.17 | 0.16 |
| % Potasium | 0.64 | 0.72 | 0.79 |
| Manganess, PPM | 28.40 | 24.32 | 20.24 |
| Iron, PPM | 98.99 | 111.77 | 124.54 |
| Cholesterol, MG/LB | 0.25 | 79.7 | 159.5 |

TABLE 2-continued

Analysis of hens' feed

| Ingredients | Fish Oil Supplement | | |
|---|---|---|---|
| | 0% | 5% | 10% |
| α-Tocopherol, MG/LB | 0 | 22.7 | 45.4 |

Eggs from hens receiving no fish oil, and 10% fish oil were examined over an 11 week period and 5% fish oil enriched eggs were examined over an 8 week period. At the beginning of this experiment, body weights of the three groups of chickens were 1.51±0.18 kg, 1.45±0.18 kg, and 1.47±0.11 kg (0%, 5%, and 10% fish oil diet) and at the end of eleven experimental weeks body weights were 1.56±0.04 kg and 1.64±0.15 kg (0% and 10% fish oil diet, respectively).

The results of this trial, including average hen's weight, egg production, and egg weight are shown in Tables 3, 4 and 5.

TABLE 3

Hens' weight (kg) during the experimental periods[a]

| Time (week) | Control[b] (hens = 15) (kg) | Fish oil supplemented diet[c] | |
|---|---|---|---|
| | | 5% (hens = 15) (kg) | 10% (hens = 15) (kg) |
| 0 | 1.505 ± 0.18 | 1.450 ± 0.18 | 1.468 ± 0.11 |
| 3 | 1.588 ± 0.19 | 1.540 ± 0.14 | 1.587 ± 0.14 |
| 4 | 1.612 ± 0.16 | 1.555 ± 0.14 | 1.560 ± 0.15 |
| 5 | 1.620 ± 0.18 | 1.565 ± 0.13 | 1.583 ± 0.16 |
| 6 | 1.601 ± 0.20 | 1.565 ± 0.14 | 1.573 ± 0.19 |
| 11 | 1.559 ± 0.23 | | 1.635 ± 0.15 |

[a] Data represents the mean (kg) ± S.D.
[b] Hens were fed on the regular wheat-soy diet.
[c] Hens were fed on the 5% or 10% fish oil diet.
Statistically, no significant difference between the three groups.

TABLE 4

Effect of fish oil supplementation on egg production (%)[a][b]

| Time (week) | Control[c] (hens = 45) | Fish oil supplemented diet[d] | |
|---|---|---|---|
| | | (hens = 45) 5% | (hens = 45) 10% |
| 0 | 86.5 ± 4.3 | 83.7 ± 9.6 | 85.1 ± 1.9 |
| 1 | 89.2 ± 6.4 | 92.0 ± 3.8 | 89.2 ± 2.3 |
| 2 | 80.9 ± 9.8 | 85.7 ± 2.5 | 72.5 ± 7.8 |
| 3 | 95.5 ± 13.5 | 100 ± 2.4 | 85.7 ± 8.4 |
| 4 | 92.0 ± 5.4 | 87.9 ± 3.8 | 70.8 ± 1.9 |
| 5 | 86.3 ± 3.8 | 83.4 ± 2.1 | 71.8 ± 2.9 |
| 6 | 91.4 ± 2.5 | 87.8 ± 2.0 | 75.2 ± 0.9 |
| 7 | 89.6 ± 2.8 | 86.1 ± 2.5 | 70.1 ± 3.0 |
| 8 | 89.4 ± 3.1 | 90.9 ± 0.7 | 69.2 ± 4.7 |
| 9 | 88.6 ± 1.6 | | 70.1 ± 2.9 |
| 10 | 90.6 ± 7.1 | | 77.1 ± 4.1 |
| 11 | 88.8 ± 2.8 | | 79.7 ± 5.5 |

[a] Data represents the mean ± S.D.
[b] Egg production = number of eggs/number of hens
[c] Hens were fed on the regular wheat-soy diet.
[d] Hens were fed on the 5% or 10% fish oil diet.

TABLE 5

Effect of fish oil supplementation on egg weight and cholesterol content of egg yolk.[a][b]

| Time (Week) | Egg Weight (gm) | | | Cholesterol (mg/egg) | | |
|---|---|---|---|---|---|---|
| | 0% | 5% | 10% | 0% | 5% | 10% |
| 0 | 52.3 ± 3.7 | 52.0 ± 1.7 | 50.5 ± 0.7 | 163.6 ± 14.4 | 161.3 ± 13.2 | 160.7 ± 14.9 |
| 3 | 55.7 ± 0.5 | 51.5 ± 1.8* | 51.2 ± 1.7* | 195.4 ± 15.6 | 178.1 ± 11.9 | 178.3 ± 9.3 |
| 4 | 55.9 ± 0.8 | 50.1 ± 3.4* | 49.0 ± 1.0** | 208.0 ± 14.5 | 189.0 ± 2.7* | 171.7 ± 5.2**+ |
| 5 | 53.7 ± 1.0 | 52.0 ± 2.9 | 49.5 ± 1.4* | 213.7 ± 3.7 | 194.8 ± 0.5* | 174.8 ± 2.1**+ |
| 6 | 56.2 ± 1.2 | 51.7 ± 2.7* | 52.1 ± 1.1* | 209.6 ± 3.0 | 191.9 ± 0.1* | 182.3 ± 0.6**+ |
| 7 | 57.6 ± 2.1 | 53.8 ± 0.5* | 52.6 ± 1.3** | 217.9 ± 4.9 | 218.3 ± 3.7 | 206.7 ± 0.4*+ |
| 8 | 56.7 ± 0.9 | 54.5 ± 1.7 | 51.1 ± 0.2**+ | 217.4 ± 1.0 | 219.2 ± 1.0 | 183.2 ± 1.7**++ |
| 9 | 57.5 ± 1.6 | | 51.9 ± 0.4** | 227.3 ± 3.6 | | 196.4 ± 1.9** |
| 11 | 56.7 ± 0.5 | | 52.8 ± 0.5** | 217.9 ± 1.1 | | 181.8 ± 2.0** |

[a] Data present mean ± S.D.
[b] 0%, 5%, and 10% represent the percentage of fish oil in the hen's diet.
*$p < 0.05$ compared to control group (0%)
**$p < 0.01$ same as the above
+$p < 0.05$ 10% group compared to 5% group
++$p < 0.01$ same as the above The body weight of experimental groups were not significantly different from the control group throughout the full experimental period. The egg production and egg weight of hens receive 10% fish oil were significantly decreased ($p \leq 0.05$). The rate of egg production of the hens on the 10% fish oil diet was decreased ranging from 15% to 23% after the four weeks of feeding when compared with that of hens fed regular diets. There was no significant difference in egg production between the regular diet and the 5% fish oil diet. Mean egg weight declined when hens were fed the diets containing fish oil whereas hens maintained their egg weight when given the regular wheat diet. Egg weight was significantly ($p \leq 0.05$) less on fish oil diets, but the differences became greatest ($p \leq 0.01$) at the fourth week on the fish oil diets. Thereafter, the differences became smaller with time.

In Tables 5 and 6 are summarized the cholesterol content in egg yolk of hens on the diets containing 0%, 5%, and 10% fish oil. The cholesterol content in the eggs from the 10% fish oil diet was significantly decreased ($p \leq 0.05$ and $p \leq 0.01$) (although egg weight was somewhat smaller also). However, it is apparent that the higher level of fish oil in the hen's diet most efficiently decreased cholesterol content of egg yolk. The cholesterol content of egg on the 10% fish oil diet was significantly ($p \leq 0.01$) lower than that in the 5% fish oil diet at Time =4, 5, 6, 7 and 8 weeks, even when the difference in egg weight between the two groups is taken into consideration.

The composition of fatty acids in the egg yolk is shown in Table 7. On regular wheat-soy diet, the fatty acids of egg yolk contained about 51% oleic acid, 25% palmitic acid, 13% stearic acid, 7% linoleic acid, and a relatively small amount (1-2%) in total of lauric acid, myristic acid, linolenic acid, eicosatrienoic acid, and arachidonic acid. When consumed in amounts of 5% and 10%, the fish oil produced marked increases in DHA (8.7-10%) and small increases in EPA (about 1.0–1.7%) in the egg yolk. Both DHA and EPA are omega-3 fatty acids and the incorporation rate of omega-3 fatty acids into egg yolk, if graphed, generally increased linearly from the first week to the sixth week and thereafter remained asymptomatic. Besides the changes which occurred in the ratio of total saturated to total unsaturated fatty acids in egg yolk (unsaturated increased dramatically in eggs from hens fed fish oil), the most important change was in the relative proportions of oleic acid to EPA and DHA. The eggs produced on the fish oil diet contained a significantly ($p \leq 0.05$) lower level of oleic acid suggesting that omega-3 fatty acids were incorporated into the egg yolks with a related decrease of oleic acid. The proportions of EPA and DHA in egg yolk of 10% fish oil diet were 1.7% and 12% respectively of the total fatty acids. There was no significant difference in total fatty acid content of the eggs from hens fed fish oil as compared to eggs from hens fed a regular or control diet (3125±275mg/egg).

TABLE 6

Effect of fish oil on cholesterol content in per gram of egg[a]

| Time (week) | Control[b] | Fish oil supplementation by weight[c] | |
|---|---|---|---|
| | | 5% | 10% |
| 0 | 3.46 ± 0.09 | 3.49 ± 0.08 | 3.42 ± 0.09 |
| 3 | 3.66 ± 0.11 | 3.64 ± 0.22 | 3.56 ± 0.21 |
| 4 | 3.73 ± 0.23 | 3.67 ± 0.04 | 3.64 ± 0.06 |
| 5 | 3.64 ± 0.01 | 3.66 ± 0.01 | 3.43 ± 0.04** |
| 6 | 3.78 ± 0.06 | 3.69 ± 0.01 | 3.49 ± 0.02**+ |
| 7 | 3.75 ± 0.01 | 3.75 ± 0.05 | 3.60 ± 0.02* |
| 8 | 3.83 ± 0.02 | 3.80 ± 0.02 | 3.50 ± 0.04**++ |
| 9 | 3.98 ± 0.06 | | 3.77 ± 0.01** |
| 11 | 3.84 ± 0.02 | | 3.47 ± 0.04** |

[a]Data represent the mean ± S.D.
[b]Hens were fed on the regular wheat-soy diet.
[c]Hens were fed on the 5% or 10% fish oil diet.
*$p < 0.05$ compared to control eggs
**$p < 0.01$ compared to control eggs
+$p < 0.05$ 10% compared to 5%
++$p < 0.01$ 10% compared to 5%

The mean body weights of the chickens' experimental groups were not significantly different from that of the control group. This can be explained by the energy intake of the feed. The energy of feed of all three groups was approximately the same (1280 kcal/lb). Although the food intakes of the hen were not measured, food intake could be assumed to be the same because of no significant change in the hens' body weight.

A four week daily intake of the 10% fish oil enriched diet was associated with a mean drop in egg production of 23%. Based upon the body weight of the hens, energy intake should not be the factor of decreasing egg production and egg weight.

Theories Related to Example 1 Results

The specific mechanism as to why the feeding of fish oil to the hens decreases the egg cholesterol content can only be hypothesized at the time of preparation of the present application. Several previous metabolic studies have presented evidence that saturated fats raised concentrations of cholesterol as compared to other dietary constituents. The hypocholesterollemic mechanisms of fish oil may be analogous to those of polyunsaturated vegetable oils. Postulated mechanisms are as follows: an increased excretion of cholesterol before and after conversion to bile acids, an enhanced oxidation of long chain polyunsaturated fatty acids, redistribution of cholesterol due to a larger spacial occupation of polyunsaturated fatty acid, inhibition of cholesterol absorption, and inhibition of cholesterol synthesis. It is possible that fish oil could affect the hepatic cholesterol synthesis and transport of cholesterol from the liver to the developing ova. Another possibility is that fish oil can increase excretion of body cholesterol, i.e., increased conversion of cholesterol to bile acids or increased fecal excretion of cholesterol and bile acids derived from cholesterol catabolism. Cholesterol synthesis increases in hens as they mature, and this is thought to be due to an increase in the demand for egg production. It is possible that because of decreasing cholesterol content due to the pressure of the fish oil (especially in the hens fed 10% fish oil), egg production was decreased. The results suggest that a minimum level of cholesterol is maintained in the egg that is not decreased by egg production.

The percentage of oleic acid in the control eggs was about 51%. The eggs of hens consuming the fish oil had

TABLE 7

Effect of fish oil supplementation on the rate of omega-3 fatty acid incorporation into egg yolk.[ab]

| Group | Time | 12:0 | 14:0 | 16:0 | 18:0 | 18:1 | 18:2 | 18:3 | 20:4 | 20:3 | 20:5 | 22:6 |
|---|---|---|---|---|---|---|---|---|---|---|---|---|
| I | 0–11 | 1.4 ± 1.7 | 1 ± 0 | 25 ± 2 | 13 ± 4 | 51 ± 2 | 7 ± 3 | 1 ± 3 | 1 ± 1 | 1 ± 1 | — | — |
| II | 1 | 0.1 ± 0 | 1.5 ± 0.7 | 26 ± 2.6 | 12 ± 2 | 47 ± 5 | 7.3 ± 0.5 | 2.8 ± 2.2 | 1.4 ± 0.4 | 0.8 ± 0.9 | 1.3 ± 0.7 | 0.3 ± 0.6 |
| | 2 | 0.3 ± 0.4 | 9 ± 12 | 20 ± 0.7 | 14 ± 5.9 | 37 ± 22 | 6 ± 1.4 | 7.7 ± 0.7 | 0.6 ± 0.8 | 0.2 ± 0.9 | 1.1 ± 0.8 | 1.9 ± 0.1 |
| | 3 | 0.4 ± 0.8 | 1 ± 0.1 | 23 ± 0.8 | 9.3 ± 0.6 | 50 ± 0.5 | 7.6 ± 0.3 | 1.2 ± 2 | 1.2 ± 0.2 | 0.7 ± 1 | 1 ± 0.3 | 5.7 ± 0.7 |
| | 4 | 0.1 ± 0.1 | 1.2 ± 0.2 | 23 ± 0.7 | 11 ± 2.7 | 40 ± 3 | 7.5 ± 1.2 | 4.8 ± 4 | 1 ± 0.3 | 0.7 ± 0.5 | 1.2 ± 0.1 | 8.8 ± 0.7 |
| | 6 | 0.2 ± 0.5 | 1.8 ± 0.7 | 22 ± 4 | 8 ± 2 | 39 ± 7 | 8.7 ± 1 | 5.7 ± 3 | 0.8 ± 1 | 0.8 ± 0.6 | 1.2 ± 0.2 | 9.1 ± 1.5 |
| | 8 | 1.4 ± 2 | 1.5 ± 0.8 | 25 ± 7 | 7.9 ± 1 | 36 ± 5 | 9.5 ± 0.8 | 4.3 ± 0 | 0.7 ± 0.3 | 1 ± 1 | 1.1 ± 0.9 | 9.4 ± 3 |
| III | 1 | 0.1 ± 0 | 1.2 ± 0 | 27 ± 0 | 7.3 ± 0 | 47 ± 0 | 8.6 ± 0.1 | 0 ± 0 | 0.7 ± 0 | 0.7 ± 0.5 | 1.2 ± 0.7 | 0.9 ± 1.2 |
| | 2 | 0.1 ± 0.7 | 1.2 ± 1 | 25 ± 3.3 | 11 ± 1.3 | 49 ± 4.5 | 7.9 ± 0.7 | 1.2 ± 2.4 | 0.8 ± 0.9 | 0.7 ± 0.7 | 0.8 ± 0.8 | 4.2 ± 0.7 |
| | 3 | 0.2 ± 0.3 | 1 ± 0.4 | 22 ± 2.9 | 9.9 ± 0.7 | 48 ± 0.7 | 8.2 ± 0.9 | 4.8 ± 4 | 0.9 ± 0.5 | 0.1 ± 0.2 | 0.7 ± 0.7 | 7.5 ± 1 |
| | 4 | 0.4 ± 0.5 | 1.8 ± 2.2 | 22 ± 3.9 | 11 ± 2 | 40 ± 9 | 8 ± 0.5 | 6.3 ± 3 | 1.4 ± 1.6 | 1.5 ± 2.2 | 1.7 ± 0.7 | 10 ± 0.9 |
| | 6 | 1.7 ± 0.3 | 2.1 ± 0.8 | 20 ± 7.2 | 8.5 ± 2 | 38 ± 10 | 7.7 ± 2.7 | 7 ± 1.2 | 0.4 ± 0.7 | 1 ± 1 | 1.5 ± 0.6 | 12 ± 4.6 |
| | 8 | 1.9 ± 2.3 | 2 ± 7.9 | 27 ± 9 | 9.2 ± 2 | 28 ± 7 | 8.9 ± 5.6 | 6 ± 2 | 0.3 ± 0.4 | 1.2 ± 0.4 | 1.4 ± 0.4 | 11 ± 3.3 |
| | 9 | 1.8 ± 0.9 | 2.1 ± 0.8 | 27 ± 8 | 7.7 ± 1 | 29 ± 2.8 | 11 ± 5.8 | 3.5 ± 3 | 0.5 ± 0.5 | 1.6 ± 0.4 | 1.7 ± 0.4 | 10 ± 2 |
| | 11 | 0.7 ± 0.9 | 1.4 ± 0.2 | 30 ± 8.9 | 10 ± 2.5 | 29 ± 3.6 | 9.4 ± 3.1 | 8 ± 8 | 0.5 ± 1 | 0.7 ± 0.7 | 1.7 ± 0.8 | 12 ± 4.2 |

[a]All values are percent total fatty acids of egg yolk (mean ± S.D. of triplicate)
[b]Minor fatty acid components of uncertain identity or which may occur less than 0.1% have been omitted.
[c]Group I consumed control diet (normal wheat diet).
[d]Group II consumed 5% fish oil diet. Group III consumed 10% fish oil diet.

a marked increase in DHA (12%) and a small increase in EPA (1.7%). In the eggs of hens fed fish oil, it was observed that omega-3 polyunsaturated fatty acid were incorporated into egg yolk apparently at the expense of oleic acid. Oleic acid of egg yolk decreased from 51% to 29% after 10% fish oil diets for eight weeks.

It is noted that substantially more DHA as a percentage of feed was later found in the eggs of the chickens eating the feed as compared to the EPA therein. Possibly, the EPA preferentially degraded prior to being eaten more than the DHA. Also chain elongation and desaturation may have resulted in EPA being used in the synthesis of DHA. Because EPA is active for chain elongation and desaturation and DHA is stable for accumulation, the amount of DHA in the eggs of the hens feeding on fish oil could be more than the amount of EPA. Another possibility is that the hens could not systemically tolerate the high amount of EPA, and excreted the excess.

The above noted theories are presented only as a means of potentially understanding the invention and are not intended to be limiting on the scope of the invention.

EXAMPLE II

Human Metabolic Study: Effect of Fish Oil Enriched Eggs on Humans

Eleven volunteers, 3 females and 8 males between 19 and 49 years of age, were recruited. They were healthy as judged by medical history and family background. All participants were encouraged to maintain their normal activities and habitual diet. Subjects were paired according to their body weights, and was assigned to one of the two experimental groups. Group 1 consisted of 6 subjects while Group 2 contained 5 subjects.

All subjects consumed their regular habitual meals at their home throughout the study. The subjects were given two and a half dozen of eggs each week produced in accordance with one of the feed compositions shown in Table 1 of Example I and instructed to consume four of the eggs every day with their regular meals. The subjects were visited at least twice on the phone as a means to reinforce their compliance.

The experimental period consisted of a one week baseline and an eight week experimental period which was divided into two four week subperiods of a cross-over design. The advantages of the cross-over design are that each individual serves as a block in a completely randomized block design. Therefore, diets containing different amounts of omega-3 polyunsaturated fatty acids can be tested on each subject. For the first four weeks of the experimental period, Group 1 consumed four eggs per day, which were obtained from hens fed with the 10% fish oil diet of Example I. During the second four week period, this group switched to eat four eggs produced by hens on the regular wheat-soy diet. Group 2 consumed the same number of eggs per day as Group 1 did, but Group 2 did so in the reverse order relative to chicken diet. that is, Group 2 daily consumed four regular eggs for the first four week period from the regular diet hens followed by four eggs per day from hens on the 10% fish oil enriched diet for the remaining four week period.

Blood samples were obtained from each participant during the baseline period prior to ingestion of eggs and at the end of each of the two four week experimental subperiods. After an overnight fast, approximately 50 ml of blood was drawn by medical technologists. Blood samples were obtained from the antecubital vein and in vacutainers (g 21) containing heparin as an anticoagulant and placed on ice. Plasma was separated from the whole blood by centrifugation at 4° C. for 20 twenty minutes at 3500 RPM.

Starting from the baseline period, blood pressure of each participant in a recumbent position was measured in the morning, using the standardized mercury manometer with a standard cuff (13x53 cm) placed about midpoint along the upper arm. Before measurement of blood pressure, subjects were required to sit down and relax for 15 minutes. Systolic blood pressure was recorded at the point of appearance of sounds and diastolic blood pressure was recorded at the disappearance of Korotkoff sounds. In addition to the blood drawing periods, blood pressure measurements were carried out twice a week. At least three measurements were taken to get an average for each measurement.

Lipid analysis was conducted by use of a half of a milliliter of plasma from the human subjects for extraction. The internal standard method used required the addition of heptadecanoic acid into the samples. Total lipid was extracted with 15 ml chloroform-1N NaOH methanol mixture (2:1) by the method of Folch et al. The samples were homogenized and put into 55, C. waterbath for 45 minutes. The containers were flushed with nitrogen gas before capping in order to minimize oxidation of unsaturated acids. A saline solution of 3.5 ml was added and lipids were extracted by centrifugation for ten minutes. Re-extraction was carried out by taking out the chloroform phase and adding 10 ml chloroform. After two times re-extraction, the water-phase was acidified by 6N HCl and fatty acids were extracted by petroleum ether.

Gas-liquid chromatography (GLC) was utilized to determine the fatty acid compositions of the lipids. The fatty acids were converted to their methyl esters. The routine application of GLC to the determination of the composition of fatty acid samples made it essential to prepare methyl esters rapidly. Boron trifluoride-methanol ($BF_3$-methanol) converts fatty acids to their methyl esters in about 2 minutes. $BF_3$-methanol in the amount of 2 ml was added to the samples after the fatty acid extraction and heated on a steam bath for 5 minutes. A saturated NaCl solution was added until two layers were formed. The methylative fatty acid was withdrawn with a pipette and was ready for GLC analysis.

All GLC analyses were performed using a Hewlett Packard model 5890 with a flame ionization detector. A silica capillary supelcowax 10 column was attached to the gasliquid chromatography. The methyl fatty acid extracts were dried under nitrogen to be able to measure quantity and quality in the GLC. After adding 1 ml of hexane solution to the methyl fatty acid extracts, a sample was directly injected into the column. The resulting fatty acid methyl esters were identified by comparison of their retention times with those of known fatty acid standards.

An enzymatic method as described by Allain was used for the determination of cholesterol. Three enzymes were used, including cholesterol ester hydrolase, cholesterol oxidase and peroxidase. Cholesterol ester hydrolase hydrolyzed cholesterol ester to free cholesterol. The free cholesterol was oxidized by cholesterol oxidase to choles-4-en-one with the concurrent production of hydrogen. In the presence of peroxidase, the peroxide coupled with 4-amino-antipyrine and phenol to produce a chromagen with maximum absorption at 500 nm.

Table 8 provides a summary of the subjects used in the study.

TABLE 8

Characteristics of human subjects on admission to the lipid research.

| Group | Sub. No. | Age (years) | Sex | Height (cm) | Weight (kg) | % Ideal Body Weight |
|---|---|---|---|---|---|---|
| 1 | 1 | 32 | F | 165.24 | 47.67 | 85.3 |
|   | 2 | 24 | M | 185.08 | 72.64 | 85.3 |
|   | 3 | 38 | F | 165.24 | 68.10 | 109.3 |
|   | 4 | 35 | M | 175.40 | 81.72 | 103.0 |
|   | 5 | 49 | M | 172.86 | 81.72 | 104.6 |
|   | 6 | 32 | M | 177.94 | 77.18 | 89.3 |
| Mean |  | 35 |  | 173.6 | 71.5 | 96.1 |
| 2 | 7 | 47 | M | 179.00 | 87.25 | 109.0 |
|   | 8 | 30 | M | 177.94 | 70.82 | 87.6 |
|   | 9 | 22 | F | 160.16 | 61.29 | 106.2 |
|   | 10 | 19 | M | 175.40 | 68.10 | 94.2 |
|   | 11 | 39 | M | 167.78 | 75.00 | 107.8 |
| Mean |  | 31.4 |  | 172.0 | 72.5 | 101.0 |

Group 1 consumed four fish oil enriched eggs in the first four weeks; Group 2 consumed four fish oil enriched eggs in the second four week period. During the other periods, Groups 1 and 2 consumed eggs from hens fed the regular (control) diet.

Illustrated in Table 9 is a summary of the nutrients consumed by the subjects during the baseline period prior to the four week egg consumption periods and during the egg consumption periods.

TABLE 9

Intakes of key nutrients on baseline, fish oil egg, and control egg period.

| Group | period | Energy | Protein (gm/day) | CHO (gm/day) | Fat (gm/day) | Chol (mg) | P/S ratio |
|---|---|---|---|---|---|---|---|
| I | Baseline | 2493.4 ± 959* | 114 ± 41 | 285 ± 116 | 108 ± 54 | 351 ± 54 | .30 ± .1 |
|   | Fish oil eggs | 25110.9 ± 1105 | 118 ± 40 | 306 ± 141 | 90 ± 56 | 941.8 ± 36a | .21 ± .1b |
|   | Control eggs | 2164.0 ± 949 | 79 ± 38 | 273 ± 129 | 86 ± 38 | 1018 ± 232a | .18 ± .2 |
| II | Baseline | 2441.8 ± 553 | 82 ± 14 | 307 ± 71 | 96 ± 36 | 341 ± 130 | .50 ± .3 |
|   | Control eggs | 2324.4 ± 334 | 87 ± 26 | 254 ± 90 | 96 ± 36 | 1010 ± 61a | .81 ± .8b |
|   | Fish oil eggs | 2198.8 ± 88 | 75 ± 23 | 257 ± 67 | 79 ± 9 | 936 ± 93a | .15 ± .1c |

| Group | period | (NE) Niacin | (mg) Vit. E | Zn (mg) | Na (mg) | K (mg) | Ca (mg) |
|---|---|---|---|---|---|---|---|
| I | Baseline | 39.2 ± 26 | 7.1 ± 4 | 11.0 ± 4 | 4345 ± 2344 | 3614 ± 1333 | 1498 ± 81 |
|   | Fish oil eggs | 25 ± 20 | 6.3 ± 2 | 11.3 ± 2 | 3769 ± 2555 | 3546 ± 1333 | 1640 ± 426 |
|   | Control eggs | 25 ± 12 | 6.1 ± 2 | 11.4 ± 3 | 4119 ± 834 | 3580 ± 1021 | 1348 ± 629 |
| II | Baseline | 22.9 ± 8 | 13.4 ± 13 | 7.9 ± 2 | 2476 ± 1120 | 3164 ± 685 | 804 ± 667 |
|   | Control eggs | 22.9 ± 8 | 11.5 ± 12 | 7.6 ± 1 | 2908 ± 1946 | 2564 ± 934 | 632 ± 359 |
|   | Fish oil eggs | 26.8 ± 8 | 11.6 ± 5 | 8.6 ± 3.4 | 2726 ± 479 | 2726 ± 479 | 869 ± 150 |

Nutrient values were calculated from the nutripractor data base of practocare.
*: Data represents mean ± S.D. of 5-day diet records.
a: Significantly different from the baseline at $p < 0.01$.
b: Significantly different from the baseline at $p < 0.05$.

An analysis of blood fatty acid levels as a percentage by weight of total fatty acid in blood samples from the subjects is given in Table 10.

TABLE 10

Effect of omega-3 fatty acids enriched eggs on fatty acid compositions of human plasma[a,b]

| Fatty acid | group 1[c] T = 0 | group 1[c] T = 4 | group 1[c] T = 8 | group 2[d] T = 0 | group 2[d] T = 4 | group 2[d] T = 8 |
|---|---|---|---|---|---|---|
| 12:0 | 4.1 ± 2.4 | 4.8 ± 2.9 | 2.5 ± 0.9 | 3.5 ± 3 | 5.1 ± 5 | 2.8 ± 0.7 |
| 14:0 | 6.1 ± 3.6 | 6.6 ± 2.7 | 5.1 ± 0.5 | 5.3 ± 4.1 | 5.7 ± 5.3 | 6.5 ± 2.4 |
| 16:0 | 27.5 ± 2.9 | 23.6 ± 3.6 | 25.7 ± 0.2 | 23.8 ± 5.6 | 18.8 ± 5.6 | 17.4 ± 5.9 |
| 16:1 | 3.4 ± 1.5 | 4.7 ± 2.4 | 4.1 ± 0.2 | 3.1 ± 1.3 | 4.3 ± 4.5 | 2.4 ± 1.3 |
| 18:0 | 9.1 ± 2.6 | 6.1 ± 1.2* | 6.8 ± 0.3 | 7.5 ± 3 | 7.5 ± 3.2 | 5.9 ± 2.6 |
| 18:1 | 18.4 ± 5.4 | 15.4 ± 3.8 | 14.8 ± 0.7 | 14.8 ± 6.7 | 13.2 ± 4.3 | 14.4 ± 2.1 |
| 18:2 | 17.5 ± 4.5 | 13.9 ± 5.9 | 21.7 ± 1.2 | 19.6 ± 4.8 | 15.1 ± 6.7 | 17.6 ± 5.3 |
| 18:3 | 0.3 ± 0.3 | 0.9 ± 1.1 | 0.5 ± 0.4 | 0.5 ± 0.6 | 1.6 ± 1 | 0.2 ± 0.3 |
| 18:3 | 2.7 ± 2.2 | 3.6 ± 2.2 | 6.4 ± 3.1 | 2.3 ± 1.2 | 4.5 ± 1.7 | 9.1 ± 3.5 |
| 18:4 | 1.1 ± 0.6 | 2.2 ± 2 | 0.8 ± 0.7 | 4.2 ± 3.4 | 6.1 ± 3.3 | 3.3 ± 3.2 |
| 20:0 | 0.1 ± 0.1 | 0.9 ± 0.7 | 0.5 ± 0.8 | 0.2 ± 0.2 | 3.1 ± 2.6 | 1.1 ± 1.4 |
| 20:1 | 1.3 ± 1.2 | 1.4 ± 1.6 | — | 0.6 ± 0.6 | 0.7 ± 1.6 | 0.5 ± 0.9 |
| 20:2 | 1.6 ± 1.4 | 2.8 ± 3.5 | 0.7 ± 0.8 | 6.1 ± 3.7 | 6.1 ± 3.8 | 4.1 ± 2.9 |
| 20:4 | 1.8 ± 1 | 1.2 ± 1 | 3.8 ± 3.3 | 2.2 ± 1.8 | 1.7 ± 1.9 | 1.4 ± 1.3 |
| 20:3 | 1.1 ± 1.9 | 0.1 ± 0.1 | — | 0.2 ± 0.4 | 0.2 ± 0.4 | — |
| 20:5 | 0.4 ± 0.5 | 3.5 ± 2.1* | 0.8 ± 0.5+ | 0.5 ± 0.3 | 0.4 ± 0.7 | 2.9 ± 0.6+ |
| 22:6 | 3.8 ± 5.3 | 8.9 ± 4.2* | 5.9 ± 1.5 | 5.8 ± 2.8 | 6.5 ± 4.8 | 11.9 ± 2.4+ |

[a]All values are percent total fatty acids of plasma
[b]Minor fatty acid components of uncertain identity or which may occur less than 0.1% have been omitted.
[c]Group 1 consumed 10% fish-oil enriched eggs for the first 4 weeks.
[d]Group 2 consumed 10% fish-oil enriched eggs for the second 4 weeks.
*$p < 0.05$ when compared to the T = 0 by two tail t test
+$p < 0.05$ when compared to the T = 4 by two tail t test With respect to the results shown in Table 10, small, but not significant, changes occurred in the relative proportions of palmitic acid, stearic acid, and arachidonic acid and in the ratio of total unsaturated fatty acids after the eating of eggs provided by feeding hens 10% fish oil except stearic acid in Group 1 changed significantly.

The effect of the control eggs versus 10% fish oil enriched eggs on systolic blood pressure is shown in Table 11. Systolic blood pressure significantly ($p \leq 0.05$) decreased (from 120+5 to 113+8 mm Hg) when the subjects of Group 1 consumed four eggs per day enriched in omega-3 fatty acids (i.e., fish oil enriched or resulting from hens fed fish oil in accordance with Example 1). In the subsequent four weeks, it returned nearly to the baseline value (124+10 mm Hg). The effect of the control eggs versus the 10% fish oil enriched eggs on diastolic blood pressure is also shown in Table 12. For Group 1, diastolic blood pressure decreased from 79+4 to 72+7 mm Hg at the end of the first four weeks on fish oil enriched eggs and significantly ($p \leq 0.05$) increased to nearly baseline value (80+6) by the end of the second four weeks. A similar tendency was shown in Group 2. Blood pressure remained unchanged (from a major statistical viewpoint) while eating four control eggs per day for four weeks, but the systolic blood pressure tended to decrease after eating four 10% fish oil enriched eggs per day.

EPA has a similar structure as arachidonic acid with one additional double bond at the 3-position relative to the methyl end of the chain. EPA is known to compete with arachidonic acid in the cyclooxygenase pathway that leads to synthesis of certain prostaglandins, thromboxanes, and prostacyclins. The mechanisms underlying the blood pressure lowering effect of omega-3 fatty acids may reside in the higher formation of prostaglandin $I_3$ (PG $I_3$) from EPA. DHA could act via changes of physiocochemical properties of membranes, such as fluidity and, consequently, influence activities of enzymes in the membranes, which might be independent of EPA and the eicosanoid pathway. From the present data, the decrease of blood pressure by EPA and DHA, even in a low dose, appears to be more pronounced as compared to diets enriched with linoleic or linolenic acids as shown by previous studies.

TABLE 11

Effect of experimental eggs on human blood pressure

| Time (week) | Systolic | | Diastolic | |
|---|---|---|---|---|
| | Group 1 | Group 2 | Group 1 | Group 2 |
| T = 0 | 120 ± 5 | 117 ± 7 | 79 ± 4 | 78 ± 14 |
| T = 1 | 115 ± 17 | 118 ± 13 | 76 ± 10 | 75 ± 12 |
| T = 2 | 115 ± 10 | 118 ± 17 | 76 ± 7 | 74 ± 12 |
| T = 3 | 114 ± 10 | 119 ± 10 | 68 ± 6 | 77 ± 7 |
| T = 4 | 113 ± 8@ | 119 ± 7 | 72 ± 7 | 77 ± 6 |
| T = 5 | 115 ± 7.2 | 118 ± 12 | 68 ± 7 | 69 ± 9 |
| T = 6 | 118 ± 8.2 | 118 ± 15 | 77 ± 11 | 77 ± 17 |
| T = 7 | 108 ± 11 | 114 ± 8 | 65 ± 6 | 72 ± 10 |
| T = 8 | 124 ± 10*+ | 114 ± 4 | 80 ± 6* | 78 ± 7 |

At T = 0, 4, and 8, blood pressure was tested by using the standardized mercury manometer, others were tested by using a calibrated digital haemometer.
Data represent mean ± SD.
Group 1: consumed 10% fish oil enriched eggs for the first four weeks and control eggs for first four weeks.
Group 2: consumed 10% fish oil enriched eggs for the second four weeks and control eggs for first four weeks.
@$p < 0.05$ when compared to the T = 0 value.
+$p < 0.05$ when compared to the T = 4 value.
*$p < 0.05$ compared to previous week by paired t-test.

In reviewing the effects of eating the modified eggs as shown in Table 10 (that is, eggs from hens eating fish oil) on humans, it is noted that the plasma fatty acid compositions were altered by eating fish oil enriched eggs. The 10% fish oil enriched eggs significantly increased EPA from 0.4% to 3.5% and 0.4% to 2.9% in Group 1 and Group 2, respectively. DHA was increased from 3.8% to 8.9% and 6.5% to 11.9% in Group 1 and Group 2, respectively. Stearic acid was significantly decreased in Group 1. The present data showed that omega-3 fatty acids from fish oil enriched eggs markedly replaced both the saturated fatty acids and omega-6 fatty acids in human plasma. Arachidonic acid and linoleic acid did not significantly change because of increasing omega-3 fatty acids in the plasma. In Group 1, the EPA level returned to the baseline value within four weeks after a cessation of eating the 10% fish oil enriched egg and DHA with a slower rate of decrease did not reach the baseline value after four weeks.

The blood samples were further analyzed with respect to makeup thereof. In particular, using an ultracentrifuge, VLDL (very low density lipoproteins) were separated from the plasma, and LDL (low density lipoproteins) and HDL (high density lipoproteins) were separated by the Heparin $Mn^{++}$ method followed by analysis of the cholesterol, triglycerides (TG) and phospholipids (PH) on each subfraction of lipoproteins, in addition to blood pressure. As noted above, blood pressures were measured at least twice a week throughout the experiment. Subjects were instructed on how to record their diets and asked to record their food intakes. Diet records were collected consecutively for 5 days at the beginning of the experiment and before the termination of each diet period. Subjects served as selfcontrol in a cross-over design (i.e., consumed control eggs for four weeks, then test eggs for four weeks).

It is noted that triglyceride concentrations were determined by the method described by Giegel, Ham & Clema. Lipids in plasma and lipoprotein fractions were partitioned between a water/isopropanol phase and a heptaine phase. Triglycerides extracted into the haptaine phase were saponified with sodium hydroxide which yielded free fatty acids and glycerols. The latter components, in turn, reacted with periodate generating formaldehyde which formed 3,5 diacetyl 1.3 dihydrolutidine by interacting with 2,4 pentanedione. The optical densities of this final solution were read at 415 nm by Gildford Spectrophotometer (model I25). Pure triolein solutions with 5 different concentrations were used to make a standard curve.

Plasma phospholipid concentrations were determined by the method described by Bartlett G. R. This method is based on the light absorption at 830 nm when color is developed by heating the phosphorus reaction mixture in relatively strong sulfric acid. Phospholipids were first extracted by ethanol and heating. During a so-called digestion period, phospholipid extract was baked with conc. $H_2SO_4$ for two hrs. This step was followed by color development in which $NH_4 6MO_7O_{24}.4H_2O$ and Fiske-Subbarow Reagent were added. After boiling and cooling the samples, optimal densities of these solutions were read by Gilford Spectrophotometer (model I-25) at 830 nm.

Paired student-t tests were performed on mean differences for total triglycerides (TG), phospholipids (PL), cholesterol contents of whole, very low density lipoproteins (VLDL), low density lipoproteins (LDL) and high density lipoproteins (HDL). For the blood pressure and cholesterol contents of whole, VLDL, LDL, HDL, factorial ANOVA repeated measurement tests were used to check whether there was any significant effect from variable sources. One-way ANOVA tests were also performed for dietary nutrients intake analysis.

Four regular egg supplementations were well tolerated by all subjects, but some subjects had difficulty eating four modified eggs (as used herein, the term "modified eggs" indicates eggs produced by hens fed a 10% fish-oil, by weight). There were statistically no differences between groups in nutrient intake other than cholesterol, polyunsaturated versus saturated (P/S) ration and omega-3 fatty acids. The energy intake of Group 1 was 2439±959 kcal during the baseline, whereas that of the Group 2 was 2442±553 kcal. This similarity in energy intake may be due to the fact that groups were divided on the basis of body weight. Caloric intake between Group 1 and Group 2 during the study period was not significantly different, even though there were marked discrepencies between groups due to some subjects' irregular diets. The average calorie intakes of Group 1 for the first four week period and for the second four week period were 2511±1105 and 2164±949, respectively. On the other hand, those of Group 2 during the same periods were 2324±334 and 2018±188, respectively. Subjects' baseline diet pattern was similar to that of the typical American diet. The subjects' percentage of total calorie intake from protein (16%) was within the normal range, but the proportion of carbohydrate (48%) was slightly higher than that of the average American diet due to the lower intake of fat content (36%). Average daily intake of cholesterol for Group 1 (141±12/1000 kcal) and for Group 2 (140±9/1000 kcal) during the baseline was lower than the average American intake.

When the four regular or modified eggs were added to the respective diets of the groups, daily cholesterol intake of both groups increased significantly ($p \leq 0.01$) to a mean of 435±99/1000 kcal for Group 1 and a mean of 435±60/1000 kcal for Group 2. EPA & DHA levels in the ordinary American diets are negligible. The amount of EPA and DHA levels in the modified eggs (10% fish oil feed) were calculated based on chromatographic analysis to be EPA 0.18 gm and DHA to be in a range from 1.14 to 1.18 gm in four eggs. These amounts generally equal to 2.2 percent of the total egg yolk lipids.

The concentrations of plasma lipid levels of all individuals and the means of each group during the baseline and at the end of four weeks and eight weeks are presented in Tables 12, 13, 14 and 15.

TABLE 12

Individual's plasma lipid and lipoprotein levels at the baseline and 4 weeks after the consumption of either regular eggs or modified eggs.

| Subject No.[a] | TOTAL-C (mg/dl) | | VLDL-C (mg/dl) | | LDL-C (mg/dl) | | HDL-C (mg/dl) | |
|---|---|---|---|---|---|---|---|---|
| | Baseline[b] | Modified[c] | Baseline | Modified | Baseline | Modified | Baseline | Modified |
| 1 | 218 | 233 | 19.8 | 21.6 | 145.8 | 159.5 | 52.4 | 52.0 |
| 2 | 189 | 181 | 18.1 | 18.6 | 121.8 | 111.7 | 49.6 | 50.6 |
| 3 | 200 | 200 | 16.5 | 18.8 | 131.3 | 129.7 | 52.2 | 51.5 |
| 4 | 237 | 230 | 19.8 | 21.9 | 164.0 | 152.7 | 53.2 | 55.5 |
| 5 | 217 | 225 | 19.6 | 21.6 | 144.3 | 153.8 | 53.1 | 48.9 |
| 6 | 188 | 191 | 23.9 | 22.5 | 113.7 | 119.6 | 50.4 | 48.9 |
| MEAN ± SD | 208 ± 19 | 210 ± 22 | 19.6 ± 2 | 20.8 ± 2 | 136.8 ± 18 | 137.8 ± 20 | 51.8 ± 1 | 51.3 ± 2 |
| | Baseline | Regular[d] | baseline | Regular | Baseline | Regular | Baseline | Regular |
| 7 | 209 | 245 | 23.1 | 25.5 | 133.1 | 166.5 | 52.8 | 52.5 |
| 8 | 198 | 213 | 20.5 | 20.7 | 129.2 | 147.4 | 48.3 | 44.9 |
| 9 | 224 | 251 | 22.6 | 22.7 | 146.2 | 173.2 | 55.2 | 55.1 |
| 10 | 192 | 194 | 14.3 | 16.4 | 131.6 | 135.4 | 46.1 | 42.2 |
| 11 | 203 | 218 | 18.9 | 20.9 | 133.4 | 145.5 | 50.8 | 51.1 |
| MEAN ± SD | 205 ± 12 | 224 ± 12* | 19.8 ± 3 | 21.2 ± 3 | 134.7 ± 7 | 153.6 ± 16* | 50.6 ± 4 | 49.1 ± 5 |

[a]Subject No. 1-6 for group 1, 7-11 for group 2.
[b]Values before the study.
[c]The first 4 week-modified egg supplementation period for group 1.
[d]The first 4 week-regular egg supplementation period for group 2.
*$P < 0.05$ when compared with previous one.

TABLE 13

Individual's plasma lipid and lipoprotein levels at the 4th week and 8th week after the consumption of either regular eggs or modified eggs.

| Subject No.[a] | TOTAL-C (mg/dl) | | VLDL-C (mg/dl) | | LDL-C (mg/dl) | | HDL-C (mg/dl) | |
|---|---|---|---|---|---|---|---|---|
| | Modified[b] | Regular | Modified | Regular | Modified | Regular | Modified | Regular |
| Group 1 | | | | | | | | |
| 1 | 233 | 247 | 21.6 | 33.3 | 159.5 | 161.7 | 52.0 | 52 |
| 2 | 181 | 205 | 18.6 | 28.4 | 111.7 | 126.4 | 50.6 | 49 |
| 3 | 200 | 212 | 18.8 | 29.0 | 129.7 | 131.5 | 51.5 | 51 |
| 4 | 230 | 235 | 21.9 | 36.9 | 152.7 | 146.5 | 55.5 | 51 |
| 5 | 225 | 240 | 21.6 | 35.4 | 153.8 | 151.2 | 48.9 | 53 |
| 6 | 191 | 212 | 22.5 | 27.0 | 119.6 | 134.3 | 48.9 | 51 |
| MEAN ± SD | 210 ± 22 | 225 ± 18 | 20.8 ± 2 | 31.6 ± 5* | 137.8 ± 20 | 140.1 ± 14 | 51.3 ± 2 | 51 |
| | Regular[c] | Modified | Regular | Modified | Regular | Modified | Regular | Modified |
| Group 2 | | | | | | | | |
| 7 | 245 | 224 | 25.5 | 33.8 | 166.5 | 146.2 | 52.5 | 43 |
| 8 | 213 | 205 | 20.7 | 17.6 | 147.4 | 141.0 | 44.9 | 46 |
| 9 | 251 | 222 | 22.7 | 18.6 | 173.2 | 147.0 | 55.1 | 56 |
| 10 | 194 | 200 | 16.4 | 17.5 | 135.4 | 138.9 | 42.2 | 44 |
| 11 | 218 | 199 | 20.9 | 28.2 | 145.5 | 120.4 | 51.1 | 50 |

TABLE 13-continued

Individual's plasma lipid and lipoprotein levels at the 4th week and 8th week after the consumption of either regular eggs or modified eggs.

| MEAN ± SD | 224 ± 12 | 210 ± 11 | 21.2 ± 3 | 23.1 ± 7 | 153.6 ± 16 | 138.8 ± 10* | 49.1 ± 5 | 47 |
|---|---|---|---|---|---|---|---|---|

[a]Subject No. 1-6 for group 1, 7-11 for group 2
[b]The first 4 week-modified egg supplementation period for group 1.
[c]The first 4 week-regular egg supplementation period for group 2.
*$\underline{P} < 0.05$ when compared with previous one.

TABLE 14

Effect of eggs enriched in omega-3 fatty acids on plasma lipid levels.

|  | I (n = 6) | | | II (n = 5) | | |
|---|---|---|---|---|---|---|
|  | T = 0 | T = 4 | T = 8 | T = 0 | T = 4 | T = 8 |
| Cholesterol | 208.2 ± 19 | 210.1 ± 22 | 225.0 ± 18* | 205.2 ± 12 | 224.0 ± 12* | 210.0 ± 11 |
| Triglyceride | 123.7 ± 29 | 116.5 ± 31 | 131.6 ± 10 | 104.3 ± 44 | 112.9 ± 40 | 90.8 ± 33* |
| Phospholipid | 171.6 ± 13 | 172.3 ± 13 | 175.3 ± 8.2 | 163.3 ± 8 | 161.9 ± 8 | 160.9 ± 9.4 |

*$\underline{P} < 0.05$ compared to baseline (T = 0) by paired $\underline{t}$-test.
Group I: fed on n-3 F.A. enriched eggs from the first 4 weeks.
Group II: fed on n-3 F.A. enriched eggs for the second 4 weeks.
T = 0 (baseline), T = 4 (at 4 weeks), T = 8 (at 8 weeks).

TABLE 15

Effect of eggs enriched in omega-3 fatty acids on plasma lipoprotein lipids.

|  |  | Group I (n = 6) | | | Group II (n = 5) | | |
|---|---|---|---|---|---|---|---|
|  |  | T = 0 | T = 4 | T = 8 | T = 0 | T = 4 | T = 8 |
| VLDL- | Chol. | 19.6 ± 2.4 | 20.8 ± 1.6 | 32.1 ± 4.6* | 19.8 ± 3.5 | 21.2 ± 3.3 | 23.1 ± 7.4* |
|  | TG | 69.9 ± 15 | 72.3 ± 16 | 81.8 ± 6 | 60.4 ± 24 | 64.0 ± 21 | 52.7 ± 17* |
|  | Phos. | 46.1 ± 2.9 | 43.3 ± 2.4 | 44.7 ± 2.7 | 43.1 ± 2.7 | 43.6 ± 2.8 | 45.4 ± 2.7 |
| LDL- | Chol. | 136.8 ± 18 | 137.8 ± 20 | 139.7 ± 11 | 134.7 ± 7 | 153.6 ± 16* | 138.8 ± 10 |
|  | TG | 38.3 ± 12 | 30.7 ± 18 | 36.8 ± 12 | 29.5 ± 15 | 34.0 ± 16 | 27.6 ± 15 |
|  | Phos. | 51.6 ± 5.6 | 51.3 ± 11 | 61.4 ± 7.5 | 51.9 ± 9.9 | 50.8 ± 13 | 47.0 ± 14 |
| HDL- | Chol. | 51.8 ± 1.4 | 51.3 ± 2.3 | 51.5 ± 1.4 | 50.6 ± 3.5 | 49.1 ± 5.3 | 47.8 ± 5.3 |
|  | TG | 15.9 ± 4.8 | 13.1 ± 3.4 | 11.8 ± 4.3 | 16.9 ± 4.9 | 14.6 ± 5.1 | 12.8 ± 5* |
|  | Phos. | 73.8 ± 5.6 | 67.9 ± 1.0* | 69.1 ± 0.9 | 68.2 ± 11 | 67.4 ± 3.2 | 68.4 ± 3.3 |

Chol.: Cholesterol; TG.: Triglyceride.; Phos.: Phospholipid.
T = 0 (baseline), T = 4 (at 4 weeks), T = 8 (at 8 weeks).
Group I: consumed omega-3 F.A. enriched eggs for the first 4 weeks.
Group II: consumed omega-3 F.A. enriched eggs for the second 4 weeks.
*$\underline{P} < 0.05$ compared to baseline (T = 0) by paired $\underline{t}$-test.

TABLE 16

Analysis of cholesterol changes@ in plasma and lipoproteins by ANOVA repeated measurement test.

| Period | Total-C | HDL-C | VLDL-C | LDL-C |
|---|---|---|---|---|
| Baseline | 206.86 ± 15.6[a] | 51.28 ± 2.6 | 19.75 ± 2.8[a] | 135.85 ± 13.6[a] |
| Regular | 224.64 ± 19.4[b] | 50.56 ± 3.7 | 26.93 ± 6.5[b] | 147.27 ± 15.1[b] |
| Modified | 209.94 ± 17.3[a] | 49.76 ± 4.1 | 21.88 ± 5.0[a] | 138.23 ± 15.7[a] |
| Average | 213.81 ± 18.7 | 50.53 ± 3.5 | 22.85 ± 5.7 | 140.45 ± 15.2 |

Total-C: Cholesterol in plasma.
HDL-C: Cholesterol in High Density Lipoprotein.
LDL-C: Cholesterol in Low Density Lipoprotein.
VLDL-C: Cholesterol in Very Low Density Lipoprotein.
@Mean ± S.D. of 11 subjects' lipid levels.
Fish oil: Subjects consumed four omega-3 F.A. enriched eggs per day.
Regular: Subjects consumed four regular eggs per day.
[a]$\underline{P} < 0.05$.
[b]$\underline{P} < 0.01$.

TABLE 17

Cholesterol ratio changes[a] during the different diets.

|  | I[c] | | | II[f] | | |
|---|---|---|---|---|---|---|
| [b]T = 0 | T = 4 | T = 8 | T = 0 | T = 4 | T = 8 |
| T-C/ | 4.0 ± | 4.1 ± | 4.3 ± | 4.1 ± | 4.6 ± | 4.4 ± |
| HDL-C[c] | .3 | .4 | .3 | .1 | .2** | .5 |
| LDL-C/ | 2.6 ± | 2.7 ± | 2.7 ± | 2.7 ± | 3.1 ± | 2.9 ± |

TABLE 17-continued

Cholesterol ratio changes[a] during the different diets.

|  | I[c] | | | II[f] | | |
|---|---|---|---|---|---|---|
| [b]T = 0 | T = 4 | T = 8 | T = 0 | T = 4 | T = 8 |
| HDL-C[d] | .3 | .3 | .2 | .1 | .2* | .4 |

[a]Mean ± S.D.
[b]Time in week
[c]Total cholesterol (T-C)/High Density Lipoprotein-cholesterol (HDL-C).
[d]Low Density Lipoprotein (LDL-C)/High Density Lipoprotein-cholesterol (HDL-C).
[e]I Group 1: consumed 10% fish-oil enriched eggs for the first four weeks.
[f]II Group 2: consumed 10% fish-oil enriched eggs for the second four weeks.
*$\underline{P} < 0.05$ when compared to baseline.
**$\underline{P} < 0.01$ when compared to baseline.

The mean plasma cholesterol level of the Group 1 when each subject ate four fish-oil enriched eggs per day did not change during the first four weeks. However, when the same group consumed four regular eggs per day during the following four weeks, the mean cholesterol level was significantly elevated (p<0.05) from 210±22 to 225±18 mg/dl (Table 13). In Group 2, when each subject ate four regular eggs per day during the first four week period, the mean plasma cholesterol significantly (p≦0.05) rose by 9.1% compared with the baseline level, but decreased to 210 mg/dl from 224 mg/dl while thereafter consuming four modified eggs during the second four week period. The change in mean cholesterol concentrations of VLDL and LDL were similar to those of plasma cholesterol levels. Both VLDL and LDL cholesterol levels of the Group 1 did not change during eating four modified eggs per day, but slightly increased while they consumed four regular eggs. In contrast, the mean LDL cholesterol level of Group 2 was significantly increased during eating four regular eggs (Table 15). There was a significant difference between the effect of four regular eggs and that of four modified eggs on plasma cholesterol ($p \leq 0.05$) (Table 16). There were no significant changes in HDL-cholesterol (HDL-C) level. Subjects' VLDL-C, LDL-C levels were significantly increased while the subjects were consuming four regular eggs. LDL-C levels remained relatively unchanged while consuming four modified eggs. LDL-C levels remained relatively unchanged when Group 1 switched from modified eggs to regular eggs, probably due to the carry-over effect of the modified eggs (Table 15).

Plasma cholesterol levels of individuals who consumed four modified eggs varied from a decrease of 12% to an increase of 7%. In Group 2, most of the total cholesterol change was attributed to LDL-C changes. It appears that LDL-C levels seem to be sensitive to the intake of omega-3 fatty acids through modified eggs (Tables 12 and 13). As a result of these inconsistent changes, the ratios of T-C/HDLC and LDL-C/HDL-C were not altered when eating the modified eggs (Table 17). Both T-C/HDL-C and LDL-C/HDL-C ratios were significantly elevated while subjects consumed four regular eggs.

Triglyceride levels in plasma and VLDL, HDL, were significantly reduced in Group 2 subjects while they were eating four modified eggs per day, but the subjects' HDL-TG (high density lipoprotein-triglyceride levels) while eating the four modified eggs, for the first four weeks in Group 1 showed marked decrease. The LDL-TG (low density lipoprotein-triglycerides) level was markedly decreased in both groups. Both regular egg and fish oil enriched egg lowered the HDL-TG. Group 1 VLDL-TG (very low density lipoprotein-triglycerides) was higher than that of Group 2 from the beginning. Relative to the regular eggs, the fish oil enriched eggs caused significant reduction in VLDL-TG in Group 2.

Blood pressure for the subjects was markedly decreased while omega-3 fatty acid enriched eggs were consumed (Tables 11, 18 and 19). Significantly different effects between four regular eggs and four modified eggs upon plasma lipids and lipoprotein lipids were found in plasma-C, VLDL-C, Plasma-TG, HDL-TG and LDL-TG ($p \leq 0.05$).

The results of the present Example show that omega-3 fatty acid enriched eggs have a hypocholesterolemic and a hypotriglyceridemic effect on humans when compared with regular eggs.

TABLE 18

Analysis of variance[a] for subjects' diastolic blood pressure changes on diets supplemented either with regular eggs or modified eggs.

| SV | df | SS | MS | F |
|---|---|---|---|---|
| Subject | 10 | 6113.8 | 611.4 | 10.37** |
| Treatment (T) | 1 | 8.9 | 8.9 | .15 |
| Error | 10 | 589.6 | 60.0 | |
| Week (W) | 3 | 701.7 | 233.9 | 3.24* |
| Error | 30 | 2168.3 | 72.3 | |
| T × W | 3 | 99.6 | 33.2 | .85 |

TABLE 18-continued

Analysis of variance[a] for subjects' diastolic blood pressure changes on diets supplemented either with regular eggs or modified eggs.

| SV | df | SS | MS | F |
|---|---|---|---|---|
| Error | 30 | 1175.9 | 39.2 | |

[a]Local factorial analysis of variances designed for balanced study was used for ANOVA repeated measurement test.
*Significant at $P < 0.05$.
**Significant at $P < 0.01$.
SV: sources of variance.
SS: sum of squares.
F: F value for ANOVA test.
df: degree of freedom.
MS: mean of squares.

TABLE 19

Analysis of variance[a] for subjects' systolic blood pressure changes on diets supplemented either with regular eggs or modified eggs.

| SV | df | SS | MS | F |
|---|---|---|---|---|
| Subject | 10 | 4640.3 | 464.0 | 10.00** |
| Treatment (T) | 1 | 130.1 | 13.0 | 1.27 |
| Error | 10 | 1023.8 | 10.2 | |
| Week (W) | 3 | 227.6 | 75.9 | 1.31 |
| Error | 30 | 1733.4 | 57.8 | |
| T × W | 3 | 257.6 | 85.9 | 2.40 |
| Error | 30 | 1072.0 | 35.7 | |

[a]Local factorial analysis of variances designed for balanced study was used for repeated measurement ANOVA test.
**Significant at $P < 0.01$.
SV: sources of variance.
SS: sum of squares.
F: F value for ANOVA test.
df: degree of freedom.
MS: mean of squares.

In particular, the results show that four regular eggs per day raised the subjects' T-C (total cholesterol in blood serum) and LDL-C levels significantly. On the other hand, subjects on the modified eggs (i.e., eggs from hens fed 10% fish oil) T-C and LDL-C levels did not change. Relatively small amounts of omega-3 fatty acid intake, (approximately 1.43 g from four modified eggs per day) caused substantial changes when compared with T-C and LDL-C levels resulting from eating four regular eggs per day. Eating four of the modified eggs had a significant effect upon reducing T-C, VLDL-C, TG, HDL-TG and LDL-TG ($p \leq 0.05$) when compared with levels resulting from eating regular eggs. Results indicate that modified egg consumption is less atherogenic than the consumption of regular eggs. Apparently, even a relatively small amount of omega-3 fatty acid in egg yolk can mitigate the hypercholesterolemic effect typical of egg yolk.

A large egg has about 80 kcal with P/S ratio of about 0.43. It contains about 280 mg cholesterol, and approximately 6 g or 10% of the weight of the egg is fat. Eggs used in Examples I and II were considered either as medium with respect to the regular (control) eggs or small with respect to the modified (fish oil enriched diet) eggs. The cholesterol content in regular and modified eggs as determined were 205 mg and 181 mg respectively. These values were not corrected for the percent of recovery from the multistep analysis, which is estimated to be approximately 85%.

Intake of subjects' nutrients between the baseline and experimental period did not significantly change except cholesterol, P/S (polyunsaturated fat to saturated fat) ratio ($p \leq 0.05$) and omega-3 fatty acid intake ($p \leq 0.01$). This indicates that subjects' diets did not vary from normal greatly except with respect to the eggs. It is noted some subjects used more than normal amounts of butter in cooking the modified eggs, and such practice significantly lowered the groups' P/S ratio.

Adding 820 mg daily of dietary cholesterol in the form of four regular eggs to the regular diets of the subjects in Group 2 for four weeks was associated with a significant increase in mean plasma total cholesterol (T-C). Subjects in Group 1 receiving four modified eggs daily (725 mg cholesterol) for four weeks, showed no significant change in plasma T-C. However, there were individual variations of plasma cholesterol concentrations in response to dietary cholesterol. The change of the individual plasma cholesterol level in response to four regular eggs ranged from a rise of 2 to 35.5 mg/dl at the end of four weeks. The plasma cholesterol levels in response to four modified eggs per day shifted from a decrease of 30 mg to a rise of 15 mg/dl at the end of four weeks. In the present study, 3 out of 11 had an increase in plasma cholesterol concentration in response to daily intake of four modified eggs. On the other hand, 10 out of 11 subjects consuming the four regular eggs for four weeks had markedly raised plasma cholesterol levels. The increase in plasma cholesterol level of Group 2 during the eating of four regular eggs can be accounted for by an increase in the LDL fraction. Group 2 had a significant increase in VLDL-C, LDL-C while consuming four regular eggs per day. In Group 1, changes in the same fractions were relatively very small in response to eating four modified eggs. Mean cholesterol level at the end of 8 weeks was higher by 14.8 mg/dl in Group 1 ($p \leq 0.05$) and by 4.6 mg/dl in Group 2 where Group 2 had consumed four regular eggs during the first four weeks and then four modified eggs during the latter half of the 8 week period. Individual variation is considered normal and overall effect on the group is relevant.

Further, eating of four modified eggs by Group 1 led to a marked decrease in TG concentrations of total LDL and HDL at the end of four weeks. Triglyceride concentrations in Group 2 were not altered much by regular eggs. Considering that the regular diet was not much varied, and the major difference between regular and modified eggs is the existence of omega-3 fatty acids, it appears that the different pattern of TG change in plasma and lipoprotein fractions between the two groups is attributable to the intakes of omega-3 fatty acids.

A very important finding of Example II is that a very small amount of omega-3 fatty acid (4.8 g per day—that is, approximately 1.2 g per egg) provided significant changes in the subjects in a relatively short period of time (four weeks). Previous studies of subjects consuming fish oil had called for much larger amounts of omega-3 fatty acids (30–60 g per day) being consumed to show profound triglyceridelowering effects. It is foreseen that a range of from 0.5 g to 1.5 g per day of omega-3 fatty acid intake is a highly effective range in accordance with the present invention. Higher ranges would be effective to produce the desired results of the invention in humans, but it would be difficult to feed chickens sufficient omega-3 fatty acid to obtain higher levels without significantly reducing egg production and it would be difficult to overcome the greater fish oil handling problems and costs.

Triglyceride-lowering effect according to the present invention presents a viable alternative therapy for patients with type V hypertriglyceridemia, since the major dietary treatment to date has been the restriction of dietary fat to between 5% and 10% of the total calories consumed to reduce plasma TG levels to within the normal range.

Blood pressure was definitely lowered by four modified eggs per day. Regular eggs apparently had no effect on blood pressure. The systolic blood pressure was lowered from 120 to 113 mm Hg when subjects consumed four modified eggs per day for four weeks in the Group 1. When the same subjects ate four regular eggs during the second half of the study period, the pressure returned to the baseline (124 mm Hg). In Group 2, both systolic and diastolic pressures were not changed during consumption of four regular eggs per day, but decreased to 114 mm Hg from 119 mm Hg during consumption of four modified eggs per day. Previous studies on the effect of eating fish oil or fish on the reduction of blood pressure, particularly the systolic pressure, have had mixed results. Such studies usually have only considered the influence of EPA and not DHA. As DHA was the principal omega-3 fatty acid accumulated in the egg yolks of the modified eggs of the present example, it appears that the DHA fatty acids have a significant effect on lowering blood pressure not previously recognized.

It is foreseen that vitamin E in amounts in excess of approximately 0.1% by weight of fatty acids, and preferably greater amounts, is beneficially added to the chicken feed containing fish oil for use in accordance with the present invention to reduce or prevent potential oxidation of omega3 fatty acids, especially EPA, prior to consumption by the hens and in this way improve the amount of omega-3 fatty acids reaching the eggs.

The modified eggs prepared for Examples I and II above may also be produced by feeding hens fish oil, omega-3 fatty acids or other long chain polyunsaturated fatty acids that have been de-scented or deodorized prior to feeding. Such deodorization may be by differential vacuum distillation techniques well known in the fish oil industry. The resulting eggs and effect on persons eating such eggs is seen to be essentially identical to that described in Examples I and II, except that the eggs would be less subject to having a "fishy" taste that might be perceived as being unpleasant by some consumers. One method of deodorizing fish oil for this purpose is by wiped-film vacuum distillation. S.C.P. Incorporated of 966 Postal Road, Allentown, PA, deodorizes fish oil utilizing a process which it refers to as super critical extraction.

It is to be understood that while certain forms of the present invention have been illustrated and described herein, it is not to be limited to the specific forms or arrangement of parts described and shown.

What is claimed and desired to be secured by Letters Patent is as follows:

1. A method of increasing the omega-3 polyunsaturated fatty acid content of chicken eggs comprising the steps of:
   (a) obtaining a grain based chicken feed;
   (b) forming a mixture of said chicken feed and an oil containing omega-3 polyunsaturated fatty acid with said oil being from about 3.0 percent to about 10.0 percent by weight of the mixture;
   (c) thereafter feeding chicken laying hens said mixture as a primary source of food for said hens; and
   (d) collecting the eggs of such hens laid subsequent to the hens eating the mixture.

2. The method according to claim 1 wherein:

(a) said oil is fish oil and is present in said mixture in a range from 3 percent to 5 percent by weight of said mixture.

3. The method according to claim 1 wherein:
(a) said oil is fish oil; and including the step of:
(b) substantially removing from the fish oil the portion thereof having a fishy smell prior to adding said fish oil to said mixture, such that said fish oil is descented and the eggs produced do not have a fishy odor.

4. The method according to claim 3 including the step of:
(a) removing the portion of the oil having a fishy smell by subjecting the oil to vacuum distillation.

5. A method of increasing the omega-3 polyunsaturated fatty acid content of chicken eggs comprising the steps of:
(a) obtaining a fish oil containing a substantial percentage of omega-3 polyunsaturated fatty acid;
(b) deodorizing said fish oil by removing from the fish oil a portion thereof having a fishy smell associated therewith;
(c) obtaining a grain based chicken feed;
(d) mixing said deodorized fish oil with said feed to form a feed composition;
(e) feeding said feed composition to chicken laying hens as a principal source of food for said hens; and
(f) thereafter collecting eggs produced by said hens.

6. The method according to claim 5 wherein:
(a) said fish oil is in a range of from about 1 percent to 10 percent by weight of said feed composition.

7. The method according to claim 5 wherein:
(a) said fish oil is in a range of from about 3 percent to 5 percent by weight of said feed composition.

8. The method according to claim 5 including the step of:
(a) applying vacuum distillation to said fish oil to remove said portion having a fishy smell therefrom.

* * * * *